(12) United States Patent
Cimatti et al.

(10) Patent No.: US 7,757,802 B2
(45) Date of Patent: Jul. 20, 2010

(54) CONNECTABLE FOUR-WHEEL DRIVE VEHICLE

(75) Inventors: Franco Cimatti, Pavullo (IT); Rudolf Morawetz, S. Caterina-Brunico (IT)

(73) Assignee: Ferrari S.p.A., Modena (IT)

( * ) Notice: Subject to any disclaimer, the term of this patent is extended or adjusted under 35 U.S.C. 154(b) by 577 days.

(21) Appl. No.: 10/589,265

(22) PCT Filed: Feb. 9, 2005

(86) PCT No.: PCT/IB2005/000381

§ 371 (c)(1), (2), (4) Date: May 24, 2007

(87) PCT Pub. No.: WO2005/080117

PCT Pub. Date: Sep. 1, 2005

(65) Prior Publication Data

US 2007/0221427 A1    Sep. 27, 2007

(30) Foreign Application Priority Data

Feb. 13, 2004  (IT)  .......................... BO2004A0068

(51) Int. Cl.
*B60K 17/35* (2006.01)

(52) U.S. Cl. ..................................... 180/247

(58) Field of Classification Search .................. 180/247, 180/248, 249, 250, 233
See application file for complete search history.

(56) References Cited

U.S. PATENT DOCUMENTS 6,314,827 B1 * 11/2001 Matsufuji ..................... 74/325

FOREIGN PATENT DOCUMENTS

EP    0 442 446    8/1991
FR    2 603 529    3/1988

OTHER PUBLICATIONS

U.S. Appl. No. 11/909,669, filed Sep. 25, 2007, Cimatti, et al.

* cited by examiner

*Primary Examiner*—Kevin Hurley
(74) *Attorney, Agent, or Firm*—Oblon, Spivak, McClelland, Maier & Neustadt, L.L.P.

(57) ABSTRACT

A connectable four-wheel drive vehicle includes an engine having a gear shaft; two main drive wheels connected permanently to the drive shaft by interposition of a gearbox having a first clutch; and two secondary drive wheels selectively connectable to the drive shaft by a connectable drive system. The connectable drive system includes a second clutch which, on one side, is connected with a fixed velocity ratio to the drive shaft upstream from the gearbox, and on another side, is connected with a fixed velocity ratio to the secondary drive wheels.

21 Claims, 3 Drawing Sheets

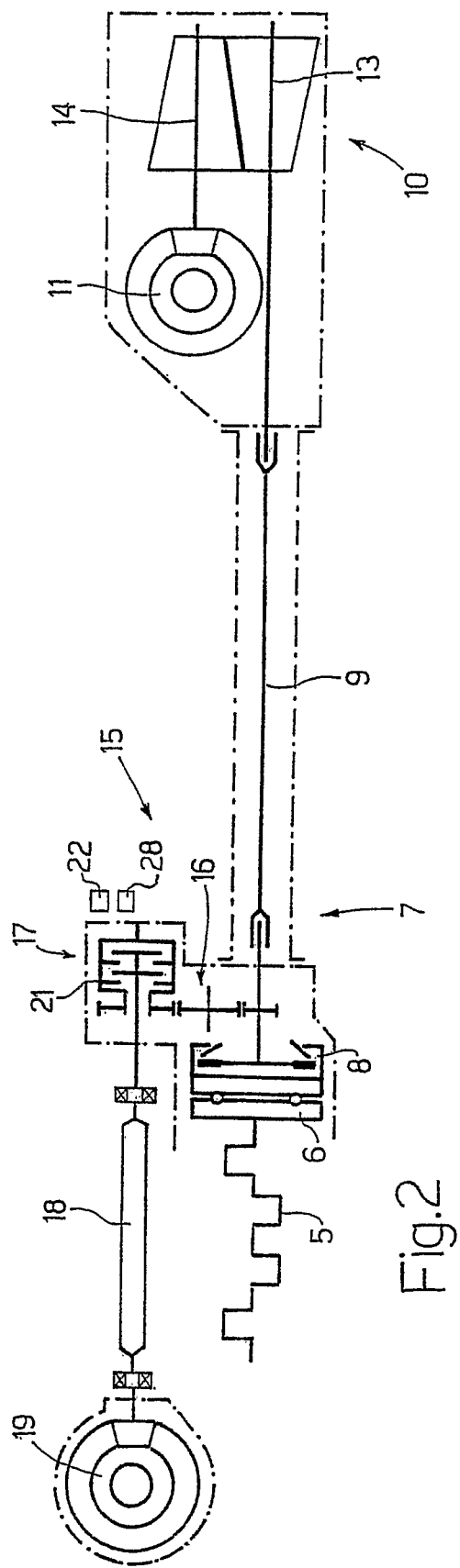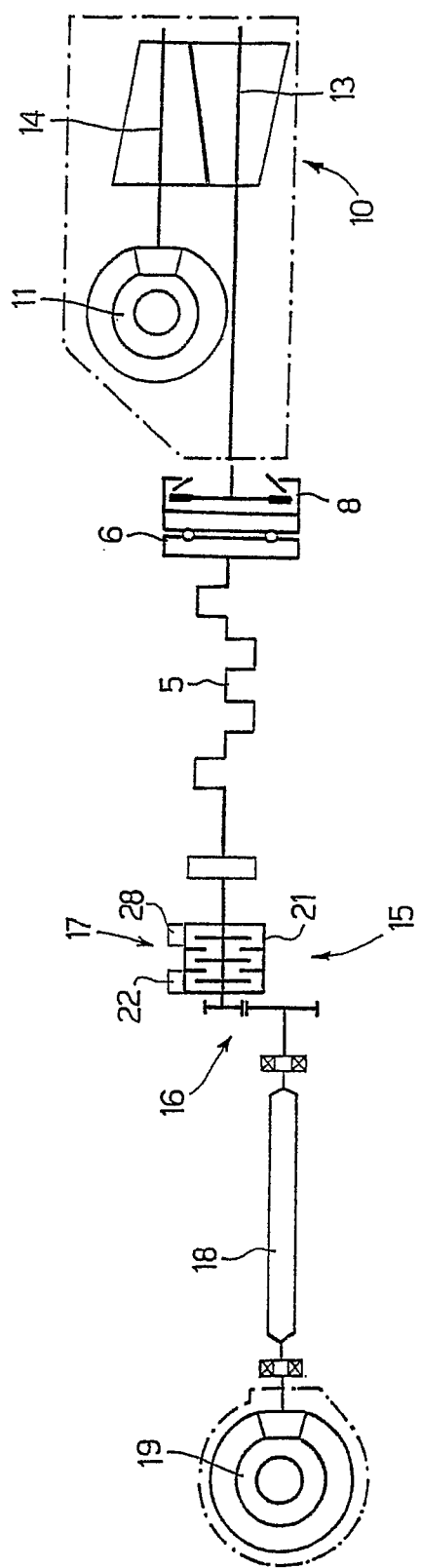

CONNECTABLE FOUR-WHEEL DRIVE VEHICLE

TECHNICAL FIELD

The present invention relates to a connectable four-wheel drive vehicle.

BACKGROUND ART

At present, high-performance on-road sports cars are normally rear-drive, and have a self-locking differential to increase the drive torque transmitted from the rear wheels to the road surface.

A rear drive with a self-locking differential has its advantages when driving fast in good (dry) or at least acceptable (wet) road-holding conditions, but, combined with a high drive torque and oversized tyres, makes for extremely difficult, and therefore potentially dangerous, driving in poor road-holding conditions (flooding or ice).

To make driving easier in poor road-holding conditions, it has been proposed to equip high-performance sports cars with a permanent or connectable four-wheel drive.

A permanent four-wheel drive greatly improves vehicle performance in poor road-holding conditions, but has the drawbacks of permanently increasing torque loss of the drive system, and of imposing vehicle performance which drivers do not always find suitable in good road-holding conditions.

A connectable four-wheel drive allows the driver to choose between a rear drive and a four-wheel drive, and so use the rear drive in good road-holding conditions, and the four-wheel drive in poor road-holding conditions. A connectable four-wheel drive, however, is complex and therefore expensive to produce. Moreover, the driver may fail to see ice on the road, and so fail to connect the four-wheel drive in time.

DISCLOSURE OF INVENTION

It is an object of the present invention to provide a connectable four-wheel drive vehicle, which is cheap and easy to produce, and, at the same time, eliminates the aforementioned drawbacks.

According to the present invention, there is provided a connectable four-wheel drive vehicle, as claimed in Claim 1 and, preferably, in any one of the following Claims depending directly or indirectly on Claim 1.

BRIEF DESCRIPTION OF THE DRAWINGS

A number of non-limiting embodiments of the present invention will be described by way of example with reference to the accompanying drawings, in which:

FIG. 2 shows an operating diagram of power transmission to the drive wheels of the FIG. 1 vehicle;

FIG. 4 shows an operating diagram of power transmission to the drive wheels of an alternative embodiment of a connectable four-wheel drive vehicle in accordance with the present invention.

BEST MODE FOR CARRYING OUT THE INVENTION

Figure 1:
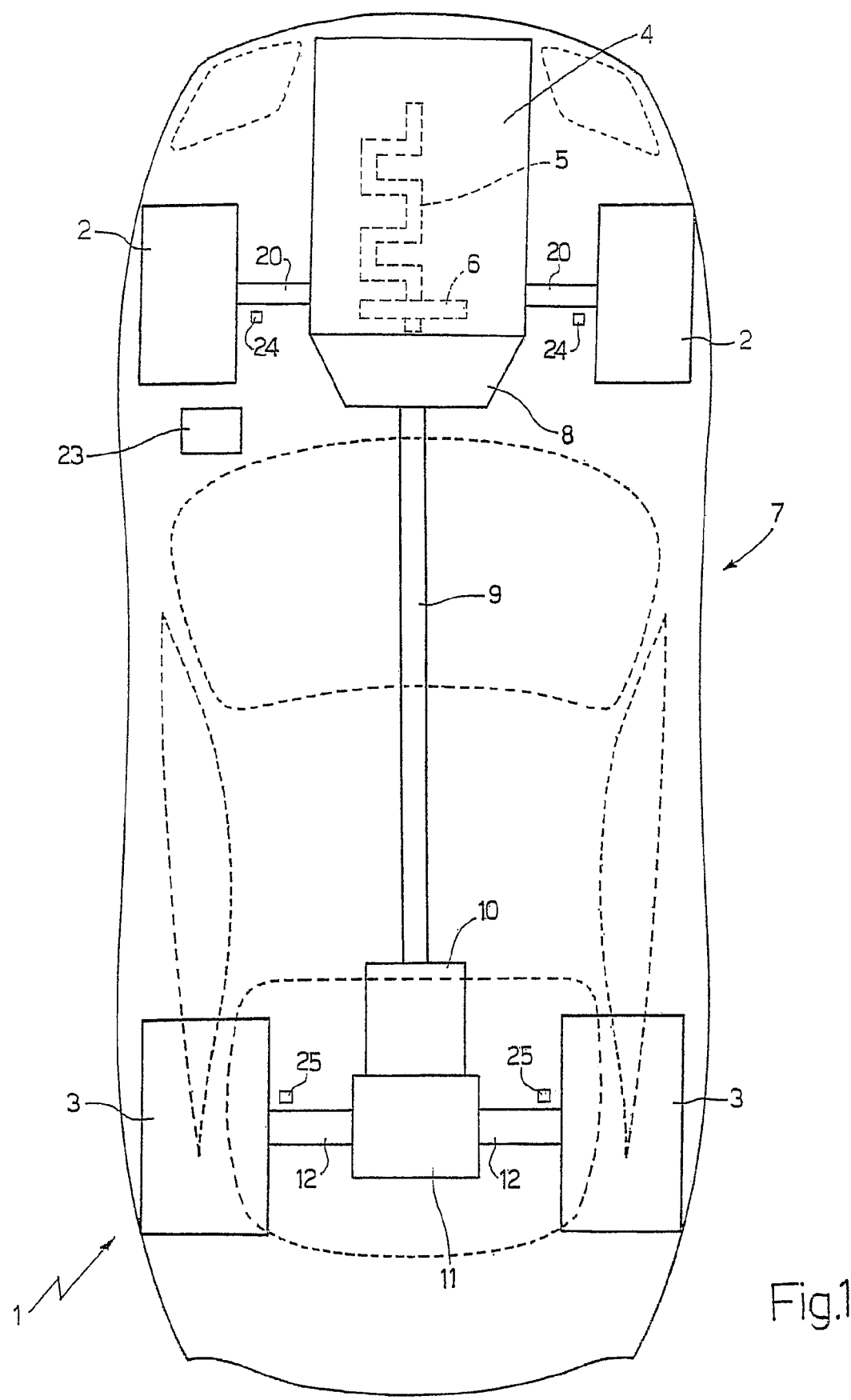
FIG. 1 shows a schematic plan view of a connectable four-wheel drive vehicle in accordance with the present invention.

Number 1 in FIG. 1 indicates a vehicle having two normally driven front (secondary drive) wheels 2, and two rear permanently driven (main drive) wheels 3. Vehicle 1 comprises a front internal combustion engine 4, which has a drive shaft 5 having a flywheel 6, and is connected to rear drive wheels 3 by a power train 7. Power train 7 comprises a dry or oil-bath (first) clutch 8, which is housed in a casing integral with engine 4, and connects drive shaft 5 of engine 4 to a (first) propeller shaft 9 terminating in a mechanical gearbox 10 at the rear. A self-locking (first) differential 11 is cascade-connected to gearbox 10, and from which extend two axle shafts 12, each integral with a respective rear drive wheel 3. More specifically, as shown in FIG. 2, a primary shaft 13 of gearbox 10 is integral with propeller shaft 9, and a secondary shaft 14 of gearbox 10 is connected to self-locking differential 11.

As shown in FIGS. 1 and 2, vehicle 1 comprises a connectable drive system 15 for mechanically connecting drive shaft 5 to front wheels 2 and so also driving front wheels 2. Connectable drive system 15 comprises a gear train 16, which is located immediately downstream from clutch 8 and therefore upstream from gearbox 10, has a constant velocity ratio, and transmits power from drive shaft 5 to an input of an oil-bath (second) clutch 17. The output of clutch 17 is connected, with a fixed velocity ratio, to front wheels 2 by a propeller shaft 18 connected to a (second) differential 19 having two axle shafts 20.

Clutch 17 has a chamber 21, which houses a number of disks integral with propeller shaft 18 and alternating with an equal number of disks integral with gear train 16, and is filled with oil for lubricating and cooling the disks. Clutch 17 also has a hydraulic actuator 22 for adjusting the relative axial thrust between the disks integral with propeller shaft 18 and the disks integral with gear train 16, so as to adjust the torque transmitted by clutch 17 between a minimum zero value and a maximum value. More specifically, the axial thrust exerted by hydraulic actuator 22 is proportional to the oil pressure P of hydraulic actuator 22; and the drive torque transmitted to propeller shaft 18 by clutch 17 is substantially proportional to oil pressure P of hydraulic actuator 22.

In an alternative embodiment, as opposed to being hydraulic, actuator 22 is electromechanical, i.e. comprises an electric motor with a mechanical transmission.

In a preferred embodiment, the velocity ratio of gear train 16 exactly matches the velocity ratio produced by the third gear of gearbox 10, and the velocity ratio of differential 19 matches that of self-locking differential 11. Consequently, when the third gear of gearbox 10 is engaged, secondary shaft 14 of gearbox 10 (related to rotation of rear wheels 3), the output of clutch 17 (related to rotation of front wheels 2), and the input of clutch 17 have the same angular speed. When the first or second gear is engaged, secondary shaft 14 of gearbox 10 and the output of clutch 17 rotate slower than the input of clutch 17. And, when a higher than third gear is engaged, secondary shaft 14 of gearbox 10 and the output of clutch 17 rotate faster than the input of clutch 17.

In an alternative embodiment, the velocity ratio of gear train 16 differs from the velocity ratio produced by the third gear of gearbox 10, and the velocity ratio of differential 19 differs from that of self-locking differential 11, so that, when the third gear of gearbox 10 is engaged, the output and input of clutch 17 have the same angular speed. In other words, the velocity ratios of gear train 16 and differential 19 are so combined that, when a gear of gearbox 10 (preferably the third gear) is engaged, the output and input of clutch 17 have the same angular speed.

Hydraulic actuator 22 has a proportional three-way solenoid valve (not shown in detail), which isolates hydraulic actuator 22 to maintain a constant oil pressure P of hydraulic actuator 22, connects hydraulic actuator 22 to an oil tank (not shown in detail) at ambient pressure to reduce the oil pressure P of hydraulic actuator 22, and connects hydraulic actuator 22 to a pressurized hydraulic accumulator (not shown in detail) to increase the oil pressure P of hydraulic actuator 22.

Figure 3:
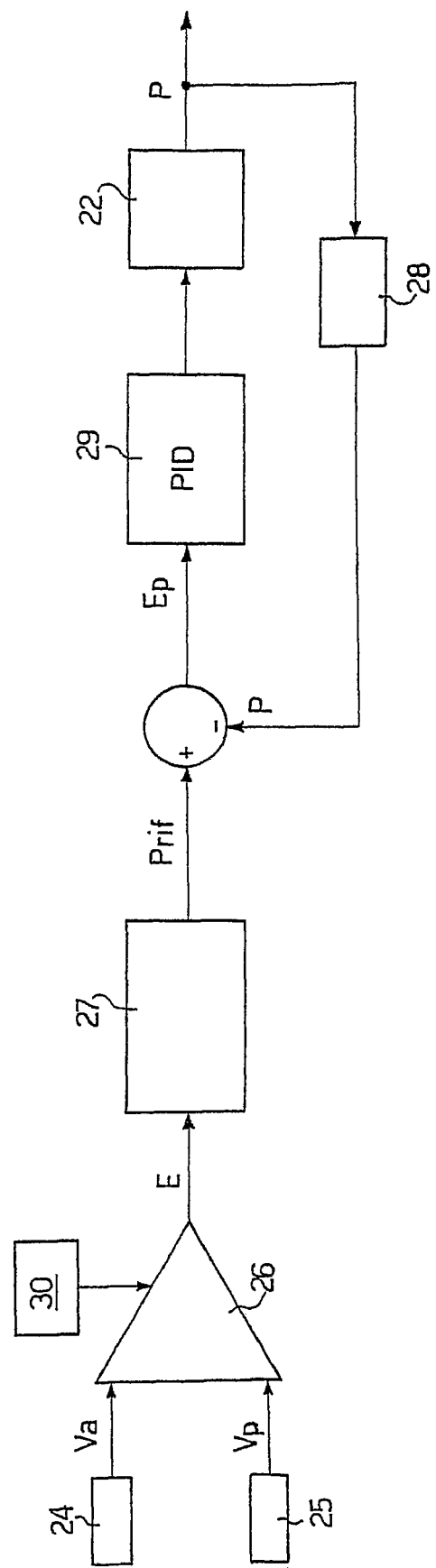
FIG. 3 shows a control scheme implemented by a central control unit of the FIG. 1 vehicle.

Hydraulic actuator 22, i.e. the solenoid valve of hydraulic actuator 22, is controlled by a control unit 23 as shown in the FIG. 3 block diagram: a sensor 24 detects the rotation speed Va of front wheels 2; a sensor 25 detects the rotation speed Vp of rear wheels 3; and a differential block 26 generates an error signal E proportional to the difference between rotation speed Va of front wheels 2 and rotation speed Vp of rear wheels 3. Error signal E is transmitted to a processing block 27 which, depending on the value of error signal E, determines the value of the drive torque, generated by engine 4, that must be transmitted by front wheels 2, and therefore the desired equivalent value Prif of oil pressure P of hydraulic actuator 22. The desired value Prif is compared with the actual value P, measured by a sensor 28, to generate a control signal Ep for controlling hydraulic actuator 22, and which is preferably also processed by a PID regulator 29 to enhance system stability and response. A preferred embodiment also comprises a further feedback control loop (not shown in detail) to current-control the solenoid valve of hydraulic actuator 22. The control loop of hydraulic actuator 22 comprises a disabling block 30 for preventing pressurization of hydraulic actuator 22 when a higher than third gear of gearbox 10 is engaged. More specifically, this can be achieved easily by imposing that, when a higher than third gear of gearbox 10 is engaged, error signal E is always zero, regardless of the actual rotation speeds Va and Vp of wheels 2 and 3.

When vehicle 1 is running and no skidding of rear wheels 3 occurs, rotation speed Va of front wheels 2 equals rotation speed Vp of rear wheels 3, so that error signal E is zero, oil pressure P of hydraulic actuator 22 is also zero, and no torque is transmitted from the input to the output of clutch 17. In other words, the drive torque generated by engine 4 is transmitted to the road by rear wheels 3, while front wheels 2 are driven by the forward movement of vehicle 1.

Conversely, in the event skidding of rear wheels 3 occurs through loss of grip, rotation speed Va of front wheels 2 is lower than rotation speed Vp of rear wheels 3, so that error signal E is positive, oil pressure P of hydraulic actuator 22 is other than zero and normally depends on the degree of skid of rear wheels 3, and torque is transmitted from the input to the output of clutch 17 to differential 19 of front wheels 2. In other words, the drive torque generated by engine 4 is transmitted to the road partly by rear wheels 3 and partly by front wheels 2, and the torque percentage transmitted by front wheels 2 is directly proportional to the degree of skid of rear wheels 3. The maximum torque transmitted to front wheels 2 may obviously be kept below a given threshold, which may be constant or variable.

It should be stressed that, when the third (synchronous) gear of gearbox 10 is engaged, the input and output of clutch 17 have the same angular speed and the disks of clutch 17 therefore rotate synchronously with no slippage, whereas, when the first or second gear of gearbox 10 is engaged, then the angular speed of the input of clutch 17 is higher than that of the output of clutch 17, so that slippage of the disks of clutch 17 occurs. In other words, in this case, clutch 17 provides for adapting rotation speed by reducing the rotation speed imposed by gear train 16 (as stated, the velocity ratio of gear chain 16 equals the velocity ratio determined by the third gear of gearbox 10).

If skidding of rear wheels 3 occurs when a higher than third gear of gearbox 10 is engaged, then a zero error signal E is maintained to prevent torque transmission via clutch 17. This control mode is necessary in that clutch 17 can adapt speed when the input of clutch 17 has a higher angular speed than the output of clutch 17, but cannot possibly adapt speed when the input of clutch 17 has a lower angular speed than the output of clutch 17.

Drive is therefore normally entrusted solely to rear wheels 3, and is automatically extended for brief periods to front wheels 2 only when skidding of rear wheels 3 occurs. It should be pointed out that drive can only be extended for brief periods to front wheels 2, in that, when adapting speed (first or second gear of gearbox 10 engaged), the oil in clutch 17 tends to heat rapidly, so that clutch 17 cannot function properly for prolonged periods (roughly of over 20-30 seconds).

The velocity ratio of gear train 16 may obviously be modified to match the velocity ratio of any other gear, other than the third gear, of gearbox 10.

In an alternative embodiment not shown, clutch 8 is located at the rear and housed in a casing integral with gearbox 10. In a further embodiment, clutch 8 is located at the rear, is housed in a casing integral with gearbox 10, and is a dual clutch.

In the FIG. 4 embodiment, engine 4 is located substantially centrally, with clutch 8 and gearbox 10 at the rear. Drive shaft 5 is connected mechanically on one side to flywheel 6 and clutch 8, and is connected on the other side directly to clutch 17, which is also substantially central. Gear train 16 is located substantially centrally, downstream from clutch 17, and propeller shaft 18 extends from the gear train and is connected to differential 19 at the front. The FIG. 4 embodiment is functionally identical with the FIGS. 1 and 2 embodiment, and is characterized by the mechanical component arrangement, and in particular the fact that drive shaft 5 transmits power to front wheels 2 on one side and to rear wheels 3 on the opposite side.

Tests have shown that connectable drive system 15 as described above provides for driving vehicle 1 in the best traction conditions in any road-holding situation, and with no assistance on the part of the driver. Moreover, connectable drive system 15 as described above, is easy to implement, is compact and lightweight, and involves no noticeable drive torque loss in rear wheel 3 drive mode.

The invention claimed is:

1. A connectable four-wheel drive vehicle comprising:
    an engine having a drive shaft;
    two main drive wheels connected permanently to the drive shaft by interposition of a gearbox having a first clutch; and
    two secondary drive wheels selectively connectable to the drive shaft by a connectable drive system;
    wherein the connectable drive system comprises a second clutch which, on one side, is connected mechanically to the drive shaft upstream from the gearbox, and, on another side, is connected mechanically to the secondary drive wheels.

2. A vehicle as claimed in claim 1, wherein the second clutch, on one side, is connected with a fixed velocity ratio to the drive shaft upstream from the gearbox, and, on another side, is connected with a fixed velocity ratio to the secondary drive wheels.

3. A vehicle as claimed in claim 1, wherein the gearbox comprises plural gears; and
    the connectable drive system includes a gear train having a velocity ratio that, when a given synchronous gear of the gearbox is engaged, the input and output of the second clutch have the same speed.

4. A vehicle as claimed in claim 3, wherein the given synchronous gear is the third gear of the gearbox.

5. A vehicle as claimed in claim 3, wherein the gear train is located downstream from the second clutch.

6. A vehicle as claimed in claim 1, wherein the second clutch is controllable to transmit a torque ranging from zero to a maximum value.

7. A vehicle as claimed in claim 6, wherein the second clutch is an oil-bath clutch.

8. A vehicle as claimed in claim 6, wherein the second clutch comprises an actuator for adjusting a position of the second clutch and therefore a value of the torque transmitted by the second clutch.

9. A vehicle as claimed in claim 1, wherein the main drive wheels are rear wheels, and the secondary drive wheels are front wheels.

10. A vehicle as claimed in claim 9, wherein the engine is at a front of the vehicle, and is connected to main rear drive wheels by a power train comprising the first clutch and a first propeller shaft terminating in the gearbox located at the rear of the vehicle; a first differential being cascade-connected to the gearbox, and from which extend two axle shafts, each integral with a respective rear drive wheel.

11. A vehicle as claimed in claim 10, wherein the first clutch is located at a rear and housed in a casing integral with the gearbox.

12. A vehicle as claimed in claim 9, wherein the engine is located centrally, the first clutch and the gearbox being located rearward.

13. A vehicle as claimed in claim 12, wherein the drive shaft is connected on one side to the first clutch to transmit power to the main drive wheels, and is connected on another side to the second clutch to transmit power to the secondary drive wheels.

14. A vehicle as claimed in claim 1, wherein the connectable drive system comprises a second differential driven by the second clutch and connected to two axle shafts integral with the secondary drive wheels.

15. A connectable four-wheel drive vehicle comprising:
an engine having a drive shaft;
two main drive wheels connected permanently to the drive shaft by interposition of a gearbox having plural gears and a first clutch; and
two secondary drive wheels selectively connectable to the drive shaft by a connectable drive system;
wherein the connectable drive system comprises a second clutch which, on one side, is connected mechanically to the drive shaft upstream from the gearbox, and, on another side, is connected mechanically to the secondary drive wheels,
the connectable drive system includes a gear train having a velocity ratio that, when a given synchronous gear of the gearbox is engaged, the input and output of the second clutch have the same speed,
wherein the gear train is located upstream from the second clutch.

16. A connectable four-wheel drive vehicle comprising:
an engine having a drive shaft;
two main drive wheels connected permanently to the drive shaft by interposition of a gearbox having a first clutch; and
two secondary drive wheels selectively connectable to the drive shaft by a connectable drive system;
wherein the connectable drive system comprises a second clutch which, on one side, is connected mechanically to the drive shaft upstream from the gearbox, and, on another side, is connected mechanically to the secondary drive wheels, wherein the second clutch is controllable to transmit a torque ranging from zero to a maximum value, and
wherein the connectable drive system is controlled by a control unit comprising a first sensor detecting rotation speed of the secondary drive wheels; a second sensor detecting rotation speed of the main drive wheels; and a differential block generating an error signal proportional to the difference between the rotation speed of the secondary drive wheels and the rotation speed of the main drive wheels; the second clutch being controlled by the control unit as a function of an error signal.

17. A vehicle as claimed in claim 16, wherein the velocity ratio of the gear train is such that, when a given synchronous gear of the gearbox is engaged, input and output of the second clutch have a same angular speed; the control unit comprising a disabling block preventing activation of the second clutch when the engaged gear of the gearbox is higher than the synchronous gear.

18. A vehicle as claimed in claim 16, wherein the velocity ratio of the gear train is such that, when a gear of the gearbox higher than a given maximum gear of the gearbox is engaged, then the input of the second clutch has a lower angular speed than the output of the second clutch; the control unit comprising a disabling block for preventing activation of the second clutch when the engaged gear of the gearbox is higher than the maximum gear.

19. A vehicle as claimed in claim 17, wherein the first clutch is located at a front and housed in a casing integral with the engine.

20. A connectable four-wheel drive vehicle comprising:
an engine having a drive shaft;
two main drive wheels connected permanently to the drive shaft by interposition of a gearbox having at least one gear and a first clutch; and
two secondary drive wheels selectively connectable to the drive shaft by a connectable drive system;
wherein the connectable drive system comprises a second clutch which, on one side, is connected to the drive shaft upstream from the gearbox in the direction of torque transmission from the engine to the gearbox, and not through any gear of the gearbox and, on another side, is connected mechanically to the secondary drive wheels.

21. A vehicle as claimed in claim 20, wherein the main drive wheels are rear wheels, and the secondary drive wheels are front wheels, wherein the engine is at a front of the vehicle and is connected to main rear drive wheels by a power train comprising the first clutch and a first propeller shaft terminating in the gearbox located at the rear of the vehicle, a first differential being cascade-connected to the gearbox, and from which extend two axle shafts, each integral with a respective rear drive wheel.

* * * * *